United States Patent
Zhao et al.

(10) Patent No.: US 12,552,351 B2
(45) Date of Patent: Feb. 17, 2026

(54) DETERMINING POSE FOR DRIVING OPERATIONS

(71) Applicant: TuSimple, Inc., San Diego, CA (US)

(72) Inventors: Yizhe Zhao, San Diego, CA (US); Zhe Chen, San Diego, CA (US); Lingting Ge, San Diego, CA (US); Panqu Wang, San Diego, CA (US)

(73) Assignee: CreateAI, Inc., San Diego, CA (US)

( * ) Notice: Subject to any disclaimer, the term of this patent is extended or adjusted under 35 U.S.C. 154(b) by 229 days.

(21) Appl. No.: 18/486,874

(22) Filed: Oct. 13, 2023

(65) Prior Publication Data

US 2025/0042369 A1    Feb. 6, 2025

Related U.S. Application Data

(60) Provisional application No. 63/517,666, filed on Aug. 4, 2023.

(51) Int. Cl.
| | |
|---|---|
| *G06T 7/00* | (2017.01) |
| *B60T 7/22* | (2006.01) |
| *B62D 15/02* | (2006.01) |
| *G06T 7/60* | (2017.01) |
| *G06T 7/70* | (2017.01) |
| *G06V 10/12* | (2022.01) |
| *G06V 20/58* | (2022.01) |
| *B60W 30/095* | (2012.01) |

(52) U.S. Cl.
CPC ............ *B60T 7/22* (2013.01); *B62D 15/0265* (2013.01); *G06T 7/60* (2013.01); *G06T 7/70* (2017.01); *G06V 10/12* (2022.01); *G06V 20/58* (2022.01); *B60W 30/0956* (2013.01); *B60W 2420/403* (2013.01); *B60W 2710/18* (2013.01); *B60W 2710/20* (2013.01); *G06T 2207/30261* (2013.01)

(58) Field of Classification Search
CPC ..... B60T 7/22; G06T 7/70; G06T 7/60; G06T 2207/30261; G06V 10/12; G06V 20/58; B62D 15/0265; B60W 30/0956; B60W 2420/403; B60W 2710/18; B60W 2710/20
USPC .......................................................... 701/26
See application file for complete search history.

(56) References Cited

U.S. PATENT DOCUMENTS

| | | | |
|---|---|---|---|
| 2022/0122289 A1* | 4/2022 | Shang | ...................... G06T 17/00 |
| 2022/0366175 A1* | 11/2022 | Yu | ......................... G05D 1/2435 |
| 2023/0145561 A1* | 5/2023 | Miao | ......................... G06T 7/80 |
| | | | 382/100 |

\* cited by examiner

*Primary Examiner* — Tiffany P Young (74) *Attorney, Agent, or Firm* — Perkins Coie LLP (57) ABSTRACT

Techniques are described for determining a set of pose information for an object when multiple sets of pose information are determined for a same object from multiple images. An example driving operation method includes obtaining, by a computer located in a vehicle, at least two sets of pose information related to an object located on a road on which the vehicle is operating, where each set of pose information includes characteristic(s) about the object, and where each set of pose information is determined from an image obtained by a camera; determining at least two weighted output vectors; determining, for the object, a set of pose information that are based on a combined weighted output vector that is obtained by combining the at least two weighted output vectors; and causing the vehicle to perform a driving-related operation using the set of pose information for the object.

18 Claims, 6 Drawing Sheets

DETERMINING POSE FOR DRIVING OPERATIONS

CROSS-REFERENCE TO RELATED APPLICATIONS

This application claims priority to and the benefit of U.S. Provisional Application No. 63/517,666, filed on Aug. 4, 2023. The aforementioned application is incorporated herein by reference in its entirety.

TECHNICAL FIELD

This document relates to systems, apparatus, and methods for determining pose from images obtained from cameras on a vehicle.

BACKGROUND

A vehicle may include sensors for several purposes. For example, sensors may be attached to the front and rear bumpers of a car to provide audible and/or visual cues to the driver to indicate a proximity of an object to the car. In another example, sensors may be installed on a roof of a vehicle to facilitate autonomous driving. Sensors can obtain data related to one or more areas that surround a vehicle. The sensor data can be processed to obtain information about the road or about the objects surrounding the autonomous vehicle. Thus, the sensor data obtained from the sensors on an autonomous vehicle can be processed or analyzed in real-time to safely maneuver the autonomous vehicle through traffic or on a highway.

SUMMARY

A vehicle may include a plurality of cameras that can provides images to an in-vehicle control computer located in the vehicle. The in-vehicle control computer can determine characteristics of object(s) located in the images from the cameras, where the determined characteristics include three-dimensional (3D) pose information for the object(s). Since a same object may be captured by two or more cameras, there may be multiple sets of 3D pose information for the same object. Thus, this patent document describes techniques for determining a set of 3D pose information for an object when multiple sets of 3D pose information are determined for a same object from multiple images.

An example method of driving operation includes obtaining, by a computer located in a vehicle, at least two sets of pose information related to an object located on a road on which the vehicle is operating, where each set of pose information includes one or more characteristics about the object, and where each set of pose information is determined from an image obtained by a camera from at least two cameras located on the vehicle; determining at least two weighted output vectors that include: a first weighted output vector that is based on a first set of pose information and a first confidence value associated with the first set of pose information, and a second weighted output vector that is based on a second set of pose information and a second confidence value associated with the second set of pose information; determining, for the object, a set of pose information that are based on a combined weighted output vector that is obtained by combining the at least two weighted output vectors; and causing the vehicle to perform a driving-related operation using the set of pose information for the object.

In some embodiments, the causing the vehicle to perform the driving-related operation includes: performing a first determination, based on a first location of the object included in the set of pose information, that the object is located within a pre-determined distance of a second location of the vehicle; and sending, in response to the first determination, an instruction that causes the vehicle to apply brakes. In some embodiments, for each set of pose information, the method further comprises: computing a first output vector that includes values that are based on a first set of values from the first set of pose information, a first set of pre-determined weights, and a first set of pre-determined bias values; computing a second output vector that includes values that are based on a second set of values from the second set of pose information, the first set of pre-determined weights, and the first set of pre-determined bias values; and determining the first confidence value for the first output vector and the second confidence value for the second output vector, wherein the first confidence value and the second confidence value respectively describes a level of confidence that the first set of pose information and the second set of pose information describe characteristics of the object.

In some embodiments, the determining the at least two weighted output vectors comprises: obtaining the first weighted output vector by combining the values of the first output vector with the first confidence value in response to the first confidence value being greater than a threshold value; and obtaining the second weighted output vector by combining the values of the second output vector with the second confidence value in response to the second confidence value being greater than the threshold value. In some embodiments, each value of the first output vector is multiplied by the first confidence value, and each value of the second output vector is multiplied by the second confidence value. In some embodiments, the method further comprises determining that a third weighted output vector for a third set of pose information is not to be calculated in response to determining that a third confidence value associated with the third set of pose information is less than the threshold value.

In some embodiments, each of the first output vector and the second output vector is computed by performing a plurality of sets of computations, each set of computations from the plurality of sets of computations includes a plurality of output values, each output value is calculated by first multiplying each value from a set of values with a corresponding weight value from the first set of pre-determined weights to obtain a set of multiplied values, and then adding values from the set of multiplied values with each other and with a bias value, and the bias value is associated with a set of computations and is from the first set of pre-determined bias values. In some embodiments, a first set of computations that is first in a sequence of computations performed for the plurality of sets of computations includes: obtaining a first set of multiplied values by multiplying each value from the first set of values from the first set of pose information with a corresponding weight from the first set of pre-determined weights; obtaining an added value by adding values from the first set of multiplied values; and obtaining an output value by adding the added value with a first bias value, wherein the first bias value is associated with the first set of computations and is from the first set of pre-determined bias values.

In some embodiments, each of the at least two sets of pose information for the object and the set of pose information for the object include a type of the object. In some embodiments, the at least two sets of pose information for the object is determined from images having a same timestamp. In some embodiments, each set of pose information includes a prior set of pose information about the object. In some embodiments, each set of pose information includes an identifier of the camera that provided the image. In some embodiments, each of the at least two sets of pose information for the object and the set of pose information for the object include a location of the object and a size of the object. In some embodiments, each of the at least two sets of pose information for the object and the set of pose information for the object include an orientation of the object on the road.

In some embodiments, each of the at least two sets of pose information for the object and the set of pose information for the object include pixel positions of wheels of the object. In some embodiments, the set of pose information is determined based on a set of values from the combined weighted output vector, a second set of pre-determined weights, and a second set of pre-determined bias values. In some embodiments, the causing the vehicle to perform the driving-related operation includes: performing a second determination, based on an orientation of the object and a type of the object included in the set of pose information, that the object is another vehicle having a first trajectory that intersects with a second trajectory of the vehicle; and sending, in response to the second determination, an instruction that causes a motor in the vehicle to steer the vehicle away from the another vehicle. In some embodiments, each of the at least two sets of pose information for the object and the set of pose information for the object include a ratio of a first area of a bounding box around the object that overlaps with another bounding box around another object to a second area of the bounding box around the object.

In yet another exemplary aspect, the above-described method is embodied in a non-transitory computer readable storage medium comprising code that when executed by a processor, causes the processor to perform the methods described in this patent document.

In yet another exemplary embodiment, a device that is configured or operable to perform the above-described methods is disclosed.

The above and other aspects and their implementations are described in greater detail in the drawings, the descriptions, and the claims.

DETAILED DESCRIPTION

An in-vehicle control computer located in a vehicle can receive sensor data from a plurality of sensors located on or in the vehicle. The sensor data may include images from a plurality of cameras located on or in the vehicle. The in-vehicle control computer can determine a presence of a same object in multiple images, and can determine characteristics of that object. The determined characteristics include three-dimensional (3D) pose information of the object, such as a location of the object (e.g., 3D coordinates of the object), size of the object, orientation of the object (e.g., yaw angle), occlusion ratio that describes for a first object a ratio of a first area in a bounding box for the first object that overlaps with another bounding box of a second object to a second area of the bounding box of the first object, semantic information (e.g., lane, ramp) associated with the object, geometric constraints of the object (e.g., pixel positions of wheels of the object), 2D observation, confidence value, and/or a type of the object (e.g., traffic sign, vehicle, etc.).

In some driving scenarios, a vehicle may include multiple cameras that can obtain images of a same object located on a road where the vehicle is operating. In such scenarios, the in-vehicle control computer determines multiple sets of 3D pose information for the same object based on images obtained at a same time. For example, an in-vehicle control computer can use three image-based depth estimation algorithms to obtain up to eight sets of 3D pose information for each two-dimensional (2D) bounding box located around an object from an image. Since the same object may appear in images obtained by multiple cameras, the in-vehicle control computer can determine several 2D bounding boxes and associated set of 3D pose information. In this example, the number of sets of 3D pose information may be thirty, which makes downstream computations difficult and intensive when the in-vehicle control computer may have to select a set of 3D pose information from the multiple sets of 3D pose information to determine and/or perform driving related operations (e.g., steer around the detected object).

This patent document describes techniques that can determine an optimal set of 3D pose information for one or more objects for which multiple sets 3D pose information have been determined from images from multiple cameras. The optimal set of 3D pose information can be determined or predicted using multiple sets of 3D pose information determined from the images from the multiple cameras. The example techniques described in this patent document can use learning-based methods to determine a set of 3D pose information based on the multiple sets of 3D pose information so that the determined accuracy of the set of 3D pose information may be improved.

Section I provides an overview of the devices/systems located on or in a vehicle, such as an autonomous semi-trailer truck. The devices/systems can be used to perform the data processing techniques that are described in Section II of this patent document to determine a set of 3D pose information for an object from multiple sets of 3D pose information for the object.

I. Vehicle Driving Ecosystem

Figure 1:
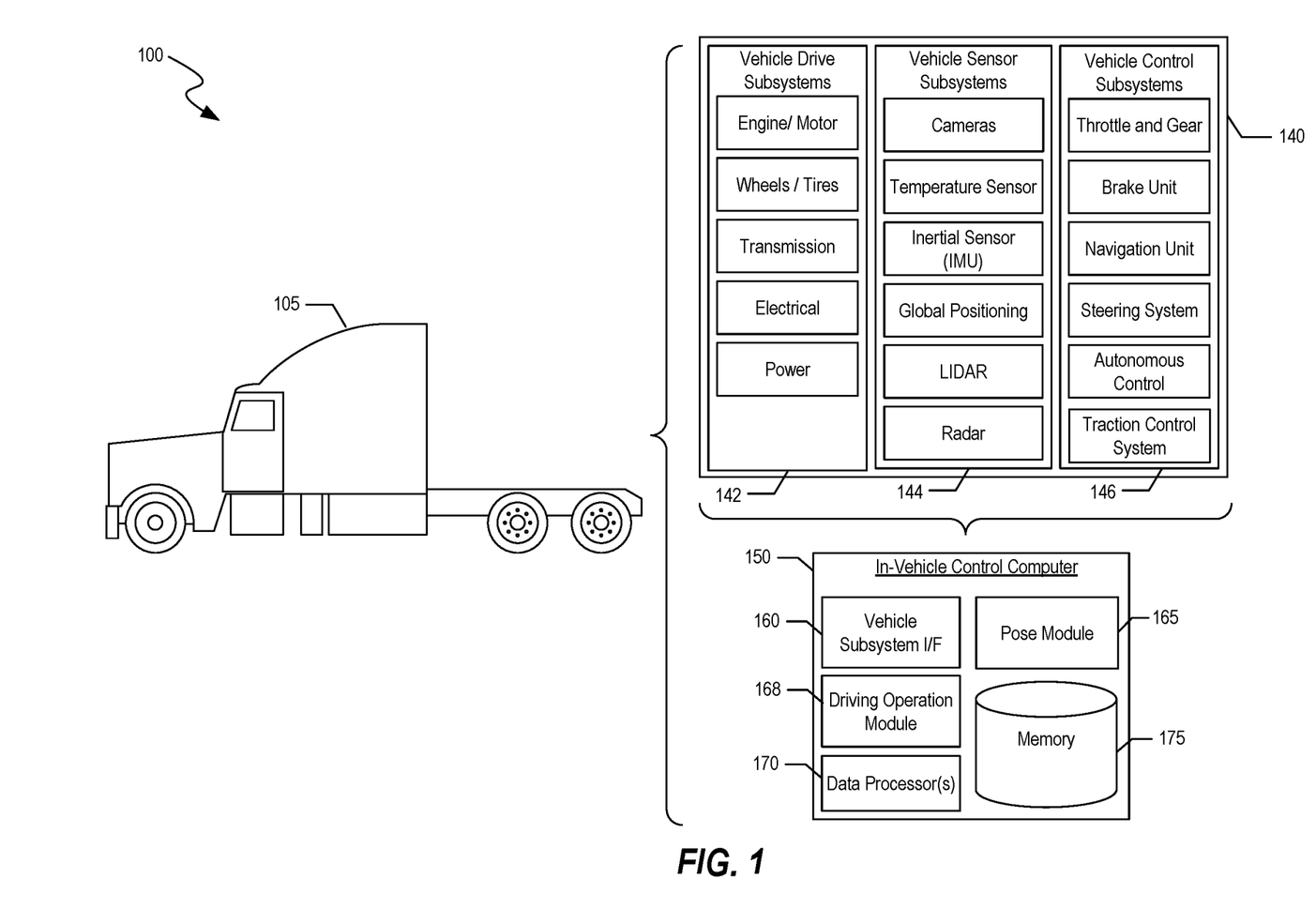
FIG. 1 shows a block diagram of an example vehicle ecosystem in which driving operations can be performed based on a set of three-dimensional (3D) pose information determined from multiple sets of 3D pose information.

FIG. 1 shows a block diagram of an example vehicle ecosystem 100 in which driving operations can be performed based on a set of 3D pose information determined from multiple sets of 3D pose information. As shown in FIG. 1, the vehicle 105 may be a semi-trailer truck. The vehicle ecosystem 100 includes several systems and components that can generate and/or deliver one or more sources of information/data and related services to the in-vehicle control computer 150 that may be located in a vehicle 105. The in-vehicle control computer 150 can be in data communication with a plurality of vehicle subsystems 140, all of which can be resident in the vehicle 105. A vehicle subsystem interface 160 is provided to facilitate data communication between the in-vehicle control computer 150 and the plurality of vehicle subsystems 140. In some embodiments, the vehicle subsystem interface 160 can include a controller area network (CAN) controller to communicate with devices in the vehicle subsystems 140.

The vehicle 105 may include various vehicle subsystems that support of the operation of vehicle 105. The vehicle subsystems may include a vehicle drive subsystem 142, a vehicle sensor subsystem 144, and/or a vehicle control subsystem 146. The components or devices of the vehicle drive subsystem 142, the vehicle sensor subsystem 144, and the vehicle control subsystem 146 as shown as examples. In some embodiment, additional components or devices can be added to the various subsystems or one or more components or devices (e.g., LiDAR or Radar shown in FIG. 1) can be removed. The vehicle drive subsystem 142 may include components operable to provide powered motion for the vehicle 105. In an example embodiment, the vehicle drive subsystem 142 may include an engine or motor, wheels/tires, a transmission, an electrical subsystem, and a power source.

The vehicle sensor subsystem 144 may include a number of sensors configured to sense information about an environment or condition of the vehicle 105. The sensors associated with the vehicle sensor subsystem 144 may be located on or in the vehicle 105. The vehicle sensor subsystem 144 may include a plurality of cameras or image capture devices, one or more temperature sensors, an inertial measurement unit (IMU), a Global Positioning System (GPS) transceiver, a laser range finder/LIDAR unit, a RADAR unit, and/or a wireless communication unit (e.g., a cellular communication transceiver). The vehicle sensor subsystem 144 may also include sensors configured to monitor internal systems of the vehicle 105 (e.g., an $O_2$ monitor, a fuel gauge, an engine oil temperature, etc.,).

The IMU may include any combination of sensors (e.g., accelerometers and gyroscopes) configured to sense position and orientation changes of the vehicle 105 based on inertial acceleration. The GPS transceiver may be any sensor configured to estimate a geographic location of the vehicle 105. For this purpose, the GPS transceiver may include a receiver/transmitter operable to provide information regarding the position of the vehicle 105 with respect to the Earth. The RADAR unit may represent a system that utilizes radio signals to sense objects within the local environment of the vehicle 105. In some embodiments, in addition to sensing the objects, the RADAR unit may additionally be configured to sense the speed and the heading of the objects proximate to the vehicle 105. The laser range finder or LIDAR unit may be any sensor configured to sense objects in the environment in which the vehicle 105 is located using lasers. The plurality of cameras may include one or more devices configured to capture a plurality of images of the environment of the vehicle 105. The cameras may be still image cameras or motion video cameras.

The vehicle control subsystem 146 may be configured to control operation of the vehicle 105 and its components. Accordingly, the vehicle control subsystem 146 may include various elements such as a throttle and gear, a brake unit, a navigation unit, a steering system and/or an autonomous control unit. The throttle may be configured to control, for instance, the operating speed of the engine and, in turn, control the speed of the vehicle 105. The gear may be configured to control the gear selection of the transmission.

The brake unit can include any combination of mechanisms configured to decelerate the vehicle 105. The brake unit can use friction to slow the wheels in a standard manner. The brake unit may include an Anti-lock brake system (ABS) that can prevent the brakes from locking up when the brakes are applied. The navigation unit may be any system configured to determine a driving path or route for the vehicle 105. The navigation unit may additionally be configured to update the driving path dynamically while the vehicle 105 is in operation. In some embodiments, the navigation unit may be configured to incorporate data from the GPS transceiver and one or more predetermined maps so as to determine the driving path for the vehicle 105. The steering system may represent any combination of mechanisms that may be operable to adjust the heading of vehicle 105 in an autonomous mode or in a driver-controlled mode.

The autonomous control unit may represent a control system configured to identify, evaluate, and avoid or otherwise negotiate potential obstacles in the environment of the vehicle 105. In general, the autonomous control unit may be configured to control the vehicle 105 for operation without a driver or to provide driver assistance in controlling the vehicle 105. In some embodiments, the autonomous control unit may be configured to incorporate data from the GPS transceiver, the RADAR, the LIDAR, the cameras, and/or other vehicle subsystems to determine the driving path or trajectory for the vehicle 105.

The traction control system (TCS) may represent a control system configured to prevent the vehicle 105 from swerving or losing control while on the road. For example, TCS may obtain signals from the IMU and the engine torque value to determine whether it should intervene and send instruction to one or more brakes on the vehicle 105 to mitigate the vehicle 105 swerving. TCS is an active vehicle safety feature designed to help vehicles make effective use of traction available on the road, for example, when accelerating on low-friction road surfaces. When a vehicle without TCS attempts to accelerate on a slippery surface like ice, snow, or loose gravel, the wheels can slip and can cause a dangerous driving situation. TCS may also be referred to as electronic stability control (ESC) system.

Many or all of the functions of the vehicle 105 can be controlled by the in-vehicle control computer 150. The in-vehicle control computer 150 may include at least one data processor 170 (which can include at least one microprocessor) that executes processing instructions stored in a non-transitory computer readable medium, such as the memory 175. The in-vehicle control computer 150 may also represent a plurality of computing devices that may serve to control individual components or subsystems of the vehicle 105 in a distributed fashion. In some embodiments, the memory 175 may contain processing instructions (e.g., program logic) executable by the data processor 170 to perform various methods and/or functions of the vehicle 105, including those described for the pose module 165 and the driving operation module 168 as explained in this patent document. And, the data processor 170 executes the operations associated with driving operation module 168 for determining and/or performing driving related operations of the vehicle 105 based on the information provided by the pose module 165. As further explained in FIGS. 2A-2D, the pose module 165 may perform operations using a machine learning technique such as a multilayer perceptron (MLP).

The memory 175 may contain additional instructions as well, including instructions to transmit data to, receive data from, interact with, or control one or more of the vehicle drive subsystem 142, the vehicle sensor subsystem 144, and the vehicle control subsystem 146. The in-vehicle control computer 150 can be configured to include a data processor 170 and a memory 175. The in-vehicle control computer 150 may control the function of the vehicle 105 based on inputs received from various vehicle subsystems (e.g., the vehicle drive subsystem 142, the vehicle sensor subsystem 144, and the vehicle control subsystem 146).

II. Example Pose Determination Techniques

Figure 2A:
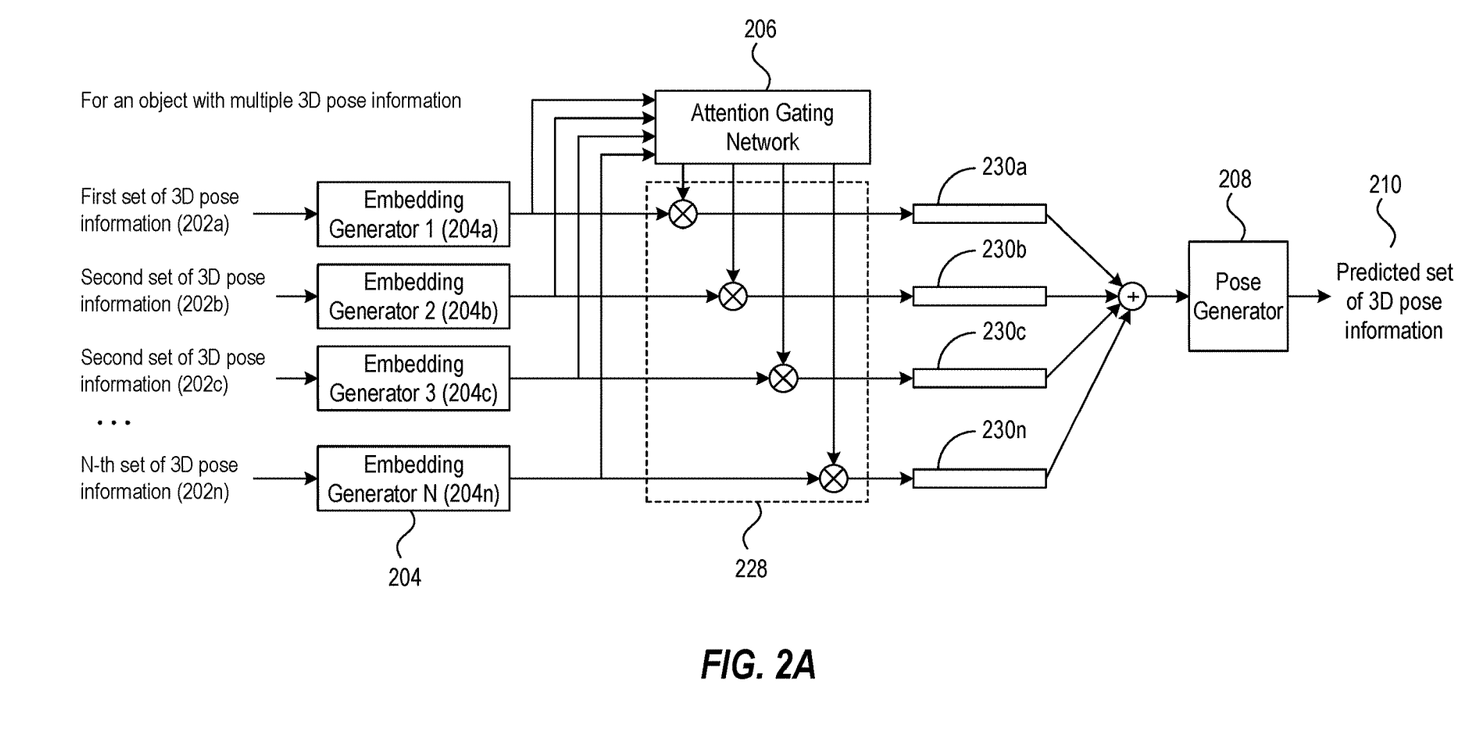
FIG. 2A shows an example block diagram to determine a set of 3D pose information for an object from multiple sets of 3D pose information for the object.

FIG. 2A shows an example block diagram to determine a set of 3D pose information for an object from multiple sets of 3D pose information for the object. The pose module can determine the multiple sets of 3D pose information about the object from images obtained from cameras and having a same timestamp. The operations associated with the embedding generator 204, attention gating network 206, and pose generator 208 may be performed by or triggered by the pose module (165 in FIG. 1) in the in-vehicle control computer. The hardware device(s) (e.g., one or more graphics processing units (GPUs)) that may perform the operations of the embedding generator 204, attention gating network 206, and pose generator 208 may be in the in-vehicle control computer (150 in FIG. 1) or it may be in one or more computers in a vehicle (105 in FIG. 1).

The pose module can send two or more sets of 3D pose information about a same object to the embedding generator 204. Each set of 3D pose information 202a-202n may include any one or more of the following:
- a location of the object (e.g., 3D coordinates of the object),
- a size of the object,
- an orientation of the object (e.g., yaw angle),
- an occlusion ratio that describes for a first object a ratio of a first area in a bounding box for the first object that overlaps with another bounding box of a second object to a second area of the bounding box of the first object. For example, in an image that comprises two objects: Object A and Object B, a bounding box may be located or added around each of the two objects. In this example, the pose module can determine the occlusion ratio of Object A by determining how much of Object A's bounding box overlaps with Object B's bounding box. Thus, if half of the area of Object A's bounding box overlaps Object B's bounding box, then the pose module determines that Object A has an occlusion ratio of 50%.
- semantic information (e.g., lane, ramp) associated with the object,
- geometric constraints of the object (e.g., pixel positions of wheels of the object),
- 2D observation,
- a confidence value that indicates an accuracy of the pose related information that describe the object, and/or
- a type of the object (e.g., traffic sign, vehicle, etc.).

In some embodiments, each set of 3D pose information 202a-202n may include an identification of a camera (e.g., camera identifier (ID)) that provided the image with which a set of 3D pose information is determined by the pose module, and/or a prior set of 3D pose information (e.g., type of object or semantic information) about the object determined by the pose module. Some examples of prior set of 3D pose information for an object may include an average size of regular small vehicles if a type of the object determined by a pose module is a "small vehicle," and/or if the pose module determines that the semantic information associated with an object is a "ramp," then the prior set of 3D pose information may include a speed limit and the heading angle of the ramp associated with the object. The techniques described in this patent document to obtain an estimated set of 3D pose information from multiple sets of 3D pose information can utilize prior sets of 3D pose information obtained from images having an earlier timestamp than the multiple sets of 3D pose information obtained from images having a timestamp later than the earlier timestamp. The pose module can input each set of 3D pose information 202a-202n as a vector in the embedding generator 204, where each embedding generators 204a-204n can perform operations associated with a corresponding set of 3D pose information as described in FIG. 2B for embedding generator 204a.

Figure 2B:
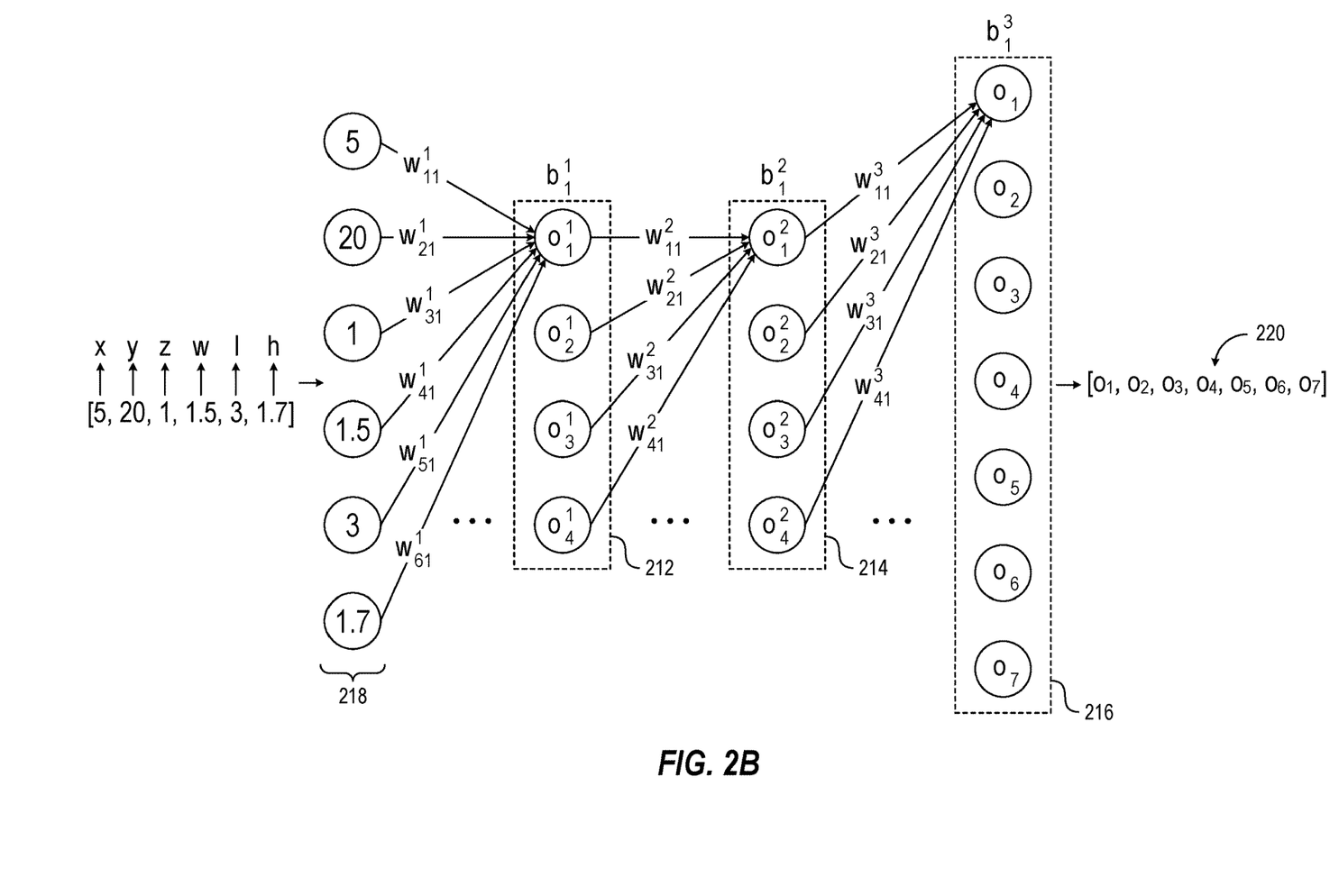
FIG. 2B shows an example data processing performed by an embedding generator on a set of 3D pose information.

FIG. 2B shows an example data processing performed by an embedding generator 204a on a set of 3D pose information 202a. The operations or technical features described for embedding generator 204a may be the same for embedding generators 204b-204n or may be similarly performed by embedding generators 204b-204n with the corresponding sets of 3D pose information 202b-202n.

The embedding generator 204a may be a multilayer perceptron (MLP) consisting of multiple layers (shown as 212-216 in FIG. 2B), where each layer may contain a different number of neurons. Each neuron (e.g., $o_1^1$, $o_2^1$, $o_3^1$, $o_4^1$, $o_1^2$, $o_2^2$ ... in FIG. 2B) in one layer is associated with a pre-determined weight w (e.g., $w_{11}^2$, $w_{21}^2$, $w_{31}^2$, $w_{41}^2$, in FIG. 2B) to every neuron (e.g., off in FIG. 2B) in the following layer. The example configuration of the embedding generator 204a includes two hidden layers 212-214), where each of the hidden layer includes four neurons. The output candidate embedding or output vector 220 of the output layer 216 includes seven dimensions [$o_1$, $o_2$, $o_3$, $o_4$, $o_5$, $o_6$, $o_7$]. The parameters of embedding generator 204a may include weight values w and bias values b (e.g., $b_1^1$, $b_1^2$, $b_1^3$) that may both be pre-determined.

The data processing performed by the pose module using the embedding generator 204a is further described in the context of an example shown in FIG. 2B. The left side of FIG. 2B shows an example set of 3D pose information 218 that includes a location of the object (shown as x, y, and z), and a size of the object (shown as w, l, and h corresponding to a width, a length, and a height). Thus, in the example shown in FIG. 2B, the set of 3D pose information 218 includes six dimensions (x, y, z, w, l, h), are input by the pose module into the embedding generator 204a.

The pose module can use the example set of values indicated in a set of 3D pose information to perform the following example computations for the first layer 212. For example, the pose module can determine $o_1^1$, and $o_2^1$, and may similarly perform computations to determine $o_3^1$, and $o_4^1$ using the following equations:

$$o_1^1 = (5 \times w_{11}^1 + 20 \times w_{21}^1 + 1 \times w_{31}^1 + 1.5 \times w_{41}^1 + 3 \times w_{51}^1 + 1.7 \times w_{61}^1) + b_1^1$$

$$o_2^1 = (5 \times w_{12}^1 + 20 \times w_{22}^1 + 1 \times w_{32}^1 + 1.5 \times w_{42}^1 + 3 \times w_{52}^1 + 1.7 \times w_{62}^1) + b_2^1$$

The pose module can perform the following example computations for the second layer 214 to determine or and may similarly perform computations to determine $o_2^2$, $o_3^2$, and $o_4^2$.

$$o_1^2 = (o_1^1 \times w_{11}^2 + o_2^1 \times w_{21}^2 + o_3^1 \times w_{31}^2 + o_4^1 \times w_{41}^2) + b_1^2$$

The pose module can perform computations for the output layer 216 in a similar manner as shown in the three equations above to determine an output vector 220 (shown as [$o_1$, $o_2$, $o_3$, $o_4$, $o_5$, $o_6$, $o_7$]). For example, $o_1$ can be computed using the following example equation:

$$o_1 = \left(o_1^2 \times w_{11}^2 + o_2^2 \times w_{21}^3 + \ldots + o_4^2 \times w_{41}^3\right) + b_1^3$$

As shown in FIG. 2A, each embedding generator 204b-204n can use the same or similar computations as those described above for embedding generator 204a to obtain a corresponding output vector. Thus, the pose module uses the embedding generator 204 to determine or calculate multiple output vectors, where each output vector is obtained from a corresponding embedding generator.

Figure 2C:
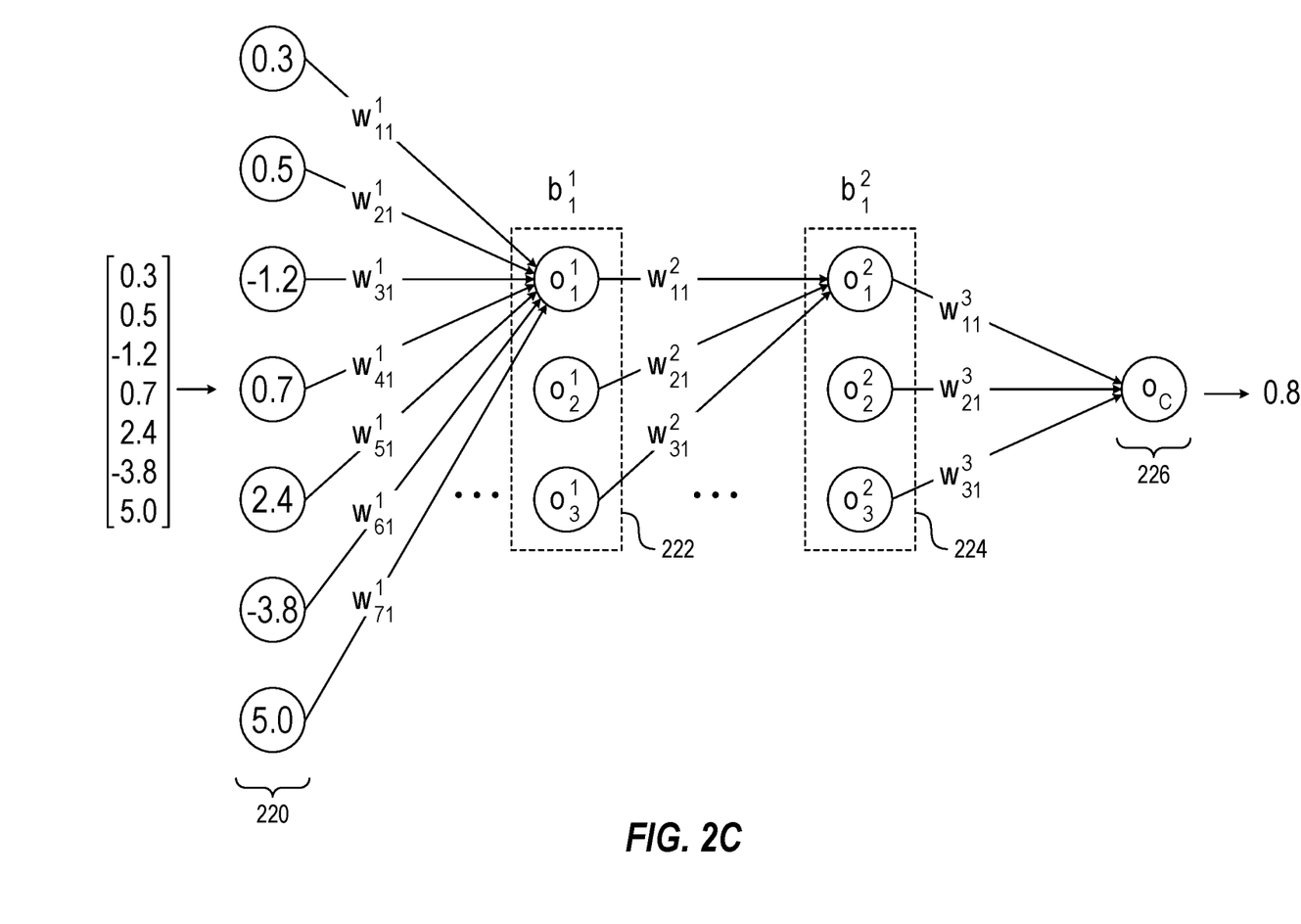
FIG. 2C shows an example data processing performed by an attention gating network on an output vector from an embedding generator.

FIG. 2C shows an example data processing performed by an attention gating network 206 on an output vector 220 from an embedding generator. In some embodiments, the attention gating network 206 may be a multi-layer perceptron (MLP) similar to the embedding generator. In some embodiments, the number of neurons may differ in input layer, hidden layers and output layer than the number of neurons in each layer of the embedding generator. The computations and/or operations described on an output vector for one embedding generator (e.g., 202a) can be individually performed for each output vector obtained from one or more other embedding generators (e.g., 202b-202n).

On the left side of FIG. 2C is an output vector 220 with some example values. The values of the output vector 220 are input in the first layer 222 of the attention gating network by the pose module. The pose module can perform the computations described for the attention gating network in a similar manner as described above for embedding generator. For example, the pose module can perform the following example computation for the first layer 222 to determine $o_1^1$ and may similarly perform computations to determine $o_2^1$ and $o_3^1$.

$$o_1^1 = \left(0.3 \times w_{11}^1 + 0.5 \times w_{21}^1 + (-1.2 \times w_{31}^1) + \ldots + 5 \times w_{71}^1\right) + b_1^1)$$

The w and b variables refer to weights and bias values, respectively. The pose module can perform the computations for the second layer 224 to determine $o_1^2$, $o_2^2$, and of using the equations shown for the second layer 214. The pose module can determine an output confidence value 226 by the following example equation:

$$o_c = \left(o_1^2 \times w_{11}^3 + o_2^2 \times w_{21}^3 + o_3^2 \times w_{31}^3\right) + b_1^2$$

The output confidence value 226 quantifies a level of confidence that a set of 3D pose information describe one or more characteristics of the object related to the set of 3D pose information. Thus, the operations described for the attention gating network that may be performed by the pose module can be performed for each output vector of each embedding generator to determine output confidence values, where each output confidence value is associated with a corresponding output vector of an embedding generator. The pose module can determine not to further process one or more output vectors in a pose generator (as further explained below) if the pose module determines that one or more confidence values corresponding to the one or more output vectors are less than a threshold value. A technical benefit of not further processing output vector(s) having confidence value(s) less than the threshold value in later computations is that it such a technique can be used to remove outliers and can be used to efficiently further perform data processing on other output vector(s) that are considered relevant.

If the pose module determines that one or more confidence values corresponding to one or more output vectors is greater than or equal to a threshold value, then the pose module performs subsequent operation as indicated in 228 and as explained for pose generator 208. As indicated in 228 of FIG. 2A, the pose module can multiply each output vector corresponding to an embedding generator with its associated output confidence value (being greater than or equal to the threshold value) to obtain a set of weighted output vector. For example, in FIG. 2A, the pose module can obtain weighted output vector 1, weighted output vector 2, . . . weighted output vector n. In embodiments where the pose module may determine a weighted output value by multiplying an output vector with its associated output confidence value, one weighted output vector is determined using information (e.g., output vector and associated confidence value) that may not be used to determine another weighted output vector. The set of weighted output vectors 230a-230n can be referred to as weighted candidate features 230a-230n shown in FIG. 2A which the pose module can input to pose generator 208. As indicated on the right hand side of FIG. 2A, after the weighted output vectors 230a-230n are obtained, the pose module can sum corresponding values from the weighted output vectors 230a-230n to obtain a weighted 3D pose embedding vector (or a combined weighted 3D pose embedding vector) that the pose module inputs in the pose generator 208.

Figure 2D:
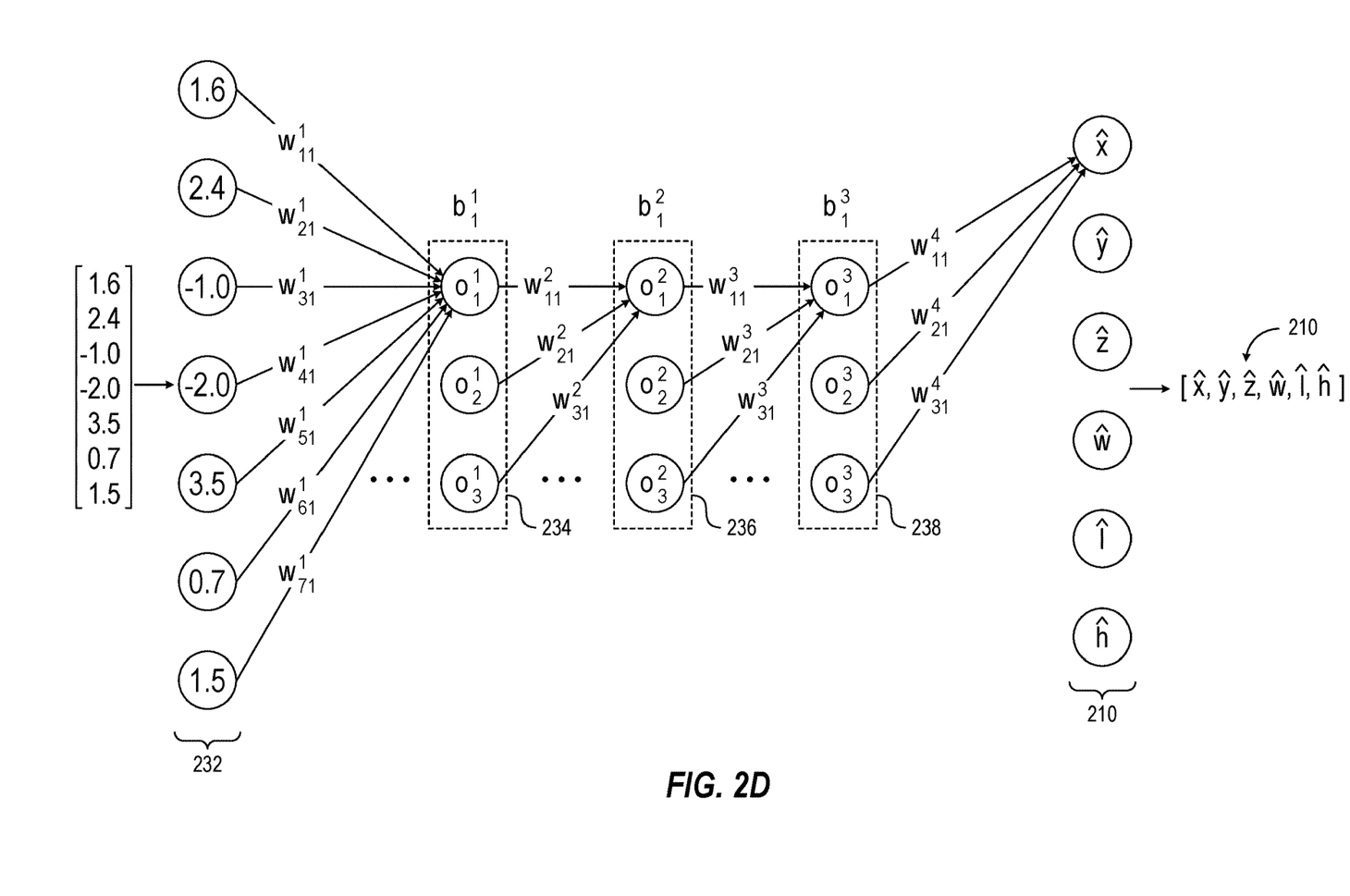
FIG. 2D shows an example data processing performed by a pose generator on weighted 3D pose embedding vector.

FIG. 2D shows an example data processing performed by a pose generator on weighted 3D pose embedding vector 232. The pose module can perform operations related to the pose generator which may be a multi-layer perceptron (MLP). The pose generator may have a different number of neurons and/or different number of layers (hidden and/or output layers) than the number of neurons and the number of layers for the embedding generator and the attention gating network. The values obtained for each neuron in each layer can be the same as that described for the embedding generator 204 and the attention gating network 206. For example, using the example set of values indicated in weighted 3D pose embedding vector 232, a value for neuron $o_1^1$ can be determined by the pose module using the equation shown below:

$$o_1^1 = \left(1.6 \times w_{11}^1 + 2.4 \times w_{21}^1 + (-1.0 \times w_{31}^1) + \ldots + 1.5 \times w_{71}^1\right) + b_1^1)$$

The w and b variables refer to weights and bias values, respectively. The pose module can use the computations performed by the pose generator to obtain an estimated or predicted set of 3D pose information 210 as shown in FIGS. 2A and 2D. In some embodiments, the pose module can also determine a confidence value for the set of 3D pose information 210.

In some embodiments, the pose module can send the estimated or predicted set of 3D pose information 210 and/or the associated confidence value to a driving operation module (shown as 168 in FIG. 1) so that the driving operation module can send instructions to one or more devices in a vehicle comprising the in-vehicle control computer to cause the vehicle to perform driving related operation(s). For example, if the driving operation module determines that a location of the object included in the estimated or predicted set of 3D pose information 210 is within a pre-determined distance of a location of the vehicle, then the driving operation module can send instructions to cause the vehicle to actuate brakes and/or apply brakes. In another example, if the driving operation module determines that an orientation and the type of the object included in the estimated or predicted set of 3D pose information 210 indicates that the object is another vehicle that has a trajectory will intersect with another trajectory of the vehicle comprising the in-vehicle control computer, then the driving operation module can send instructions one or more motors in the vehicle steering system to cause the vehicle to steer away from the another vehicle.

Figure 3:
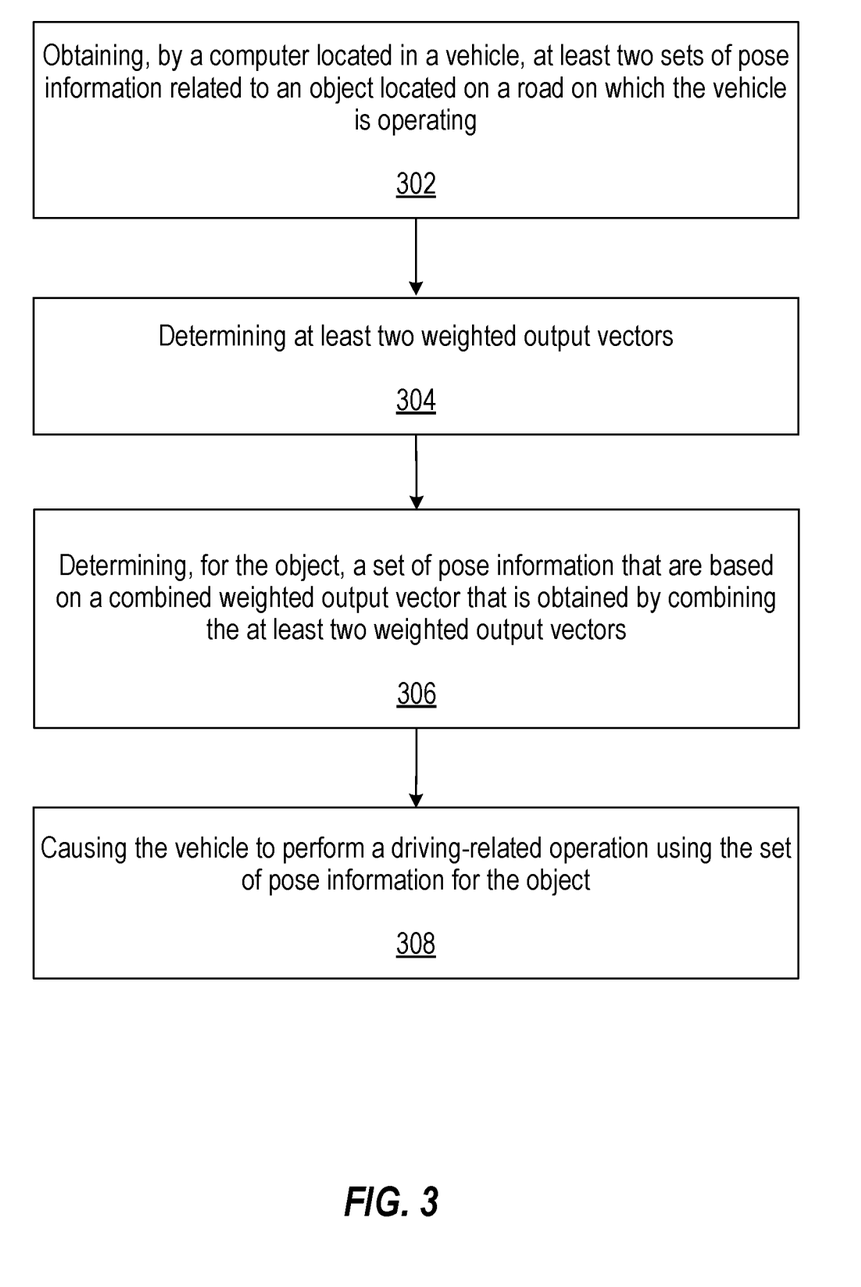
FIG. 3 shows an example flowchart of operations to determine a set of pose information for an object.

FIG. 3 shows an example flowchart of operations to determine a set of pose information for an object. Operation 302 includes obtaining, by a computer located in a vehicle, at least two sets of pose information related to an object located on a road on which the vehicle is operating, where each set of pose information includes one or more characteristics about the object, and where each set of pose information is determined from an image obtained by a camera from at least two cameras located on the vehicle. Operation 304 includes determining at least two weighted output vectors that include: a first weighted output vector that is based on a first set of pose information and a first confidence value associated with the first set of pose information, and a second weighted output vector that is based on a second set of pose information and a second confidence value associated with the second set of pose information. Operation 306 includes determining, for the object, a set of pose information that are based on a combined weighted output vector that is obtained by combining the at least two weighted output vectors. Operation 308 includes causing the vehicle to perform a driving-related operation using the set of pose information for the object. In some embodiments, operations 302-308 can be performed by a pose module as described in this patent document.

In some embodiments, the causing the vehicle to perform the driving-related operation includes: performing a first determination, based on a first location of the object included in the set of pose information, that the object is located within a pre-determined distance of a second location of the vehicle; and sending, in response to the first determination, an instruction that causes the vehicle to apply brakes. In some embodiments, for each set of pose information, the method further comprises: computing a first output vector that includes values that are based on a first set of values from the first set of pose information, a first set of pre-determined weights, and a first set of pre-determined bias values; computing a second output vector that includes values that are based on a second set of values from the second set of pose information, the first set of pre-determined weights, and the first set of pre-determined bias values; and determining the first confidence value for the first output vector and the second confidence value for the second output vector, wherein the first confidence value and the second confidence value respectively describes a level of confidence that the first set of pose information and the second set of pose information describe characteristics of the object.

In some embodiments, the determining the at least two weighted output vectors comprises: obtaining the first weighted output vector by combining the values of the first output vector with the first confidence value in response to the first confidence value being greater than a threshold value; and obtaining the second weighted output vector by combining the values of the second output vector with the second confidence value in response to the second confidence value being greater than the threshold value. In some embodiments, each value of the first output vector is multiplied by the first confidence value, and each value of the second output vector is multiplied by the second confidence value. In some embodiments, the method further comprises determining that a third weighted output vector for a third set of pose information is not to be calculated in response to determining that a third confidence value associated with the third set of pose information is less than the threshold value.

In some embodiments, each of the first output vector and the second output vector is computed by performing a plurality of sets of computations, each set of computations from the plurality of sets of computations includes a plurality of output values, each output value is calculated by first multiplying each value from a set of values with a corresponding weight value from the first set of pre-determined weights to obtain a set of multiplied values, and then adding values from the set of multiplied values with each other and with a bias value, and the bias value is associated with a set of computations and is from the first set of pre-determined bias values. In some embodiments, a first set of computations that is first in a sequence of computations performed for the plurality of sets of computations includes: obtaining a first set of multiplied values by multiplying each value from the first set of values from the first set of pose information with a corresponding weight from the first set of pre-determined weights; obtaining an added value by adding values from the first set of multiplied values; and obtaining an output value by adding the added value with a first bias value, wherein the first bias value is associated with the first set of computations and is from the first set of pre-determined bias values.

In some embodiments, each of the at least two sets of pose information for the object and the set of pose information for the object include a type of the object. In some embodiments, the at least two sets of pose information for the object is determined from images having a same timestamp. In some embodiments, each set of pose information includes a prior set of pose information about the object. In some embodiments, each set of pose information includes an identifier of the camera that provided the image. In some embodiments, each of the at least two sets of pose information for the object and the set of pose information for the object include a location of the object and a size of the object. In some embodiments, each of the at least two sets of pose information for the object and the set of pose information for the object include an orientation of the object on the road.

In some embodiments, each of the at least two sets of pose information for the object and the set of pose information for the object include pixel positions of wheels of the object. In some embodiments, the set of pose information is determined based on a set of values from the combined weighted output vector, a second set of pre-determined weights, and a second set of pre-determined bias values. In some embodiments, the causing the vehicle to perform the driving-related operation includes: performing a second determination, based on an orientation of the object and a type of the object included in the set of pose information, that the object is another vehicle having a first trajectory that intersects with a second trajectory of the vehicle; and sending, in response to the second determination, an instruction that causes a motor in the vehicle to steer the vehicle away from the another vehicle. In some embodiments, each of the at least two sets of pose information for the object and the set of pose information for the object include a ratio of a first area of a bounding box around the object that overlaps with another bounding box around another object to a second area of the bounding box around the object.

In some embodiments, a non-transitory computer readable program storage medium has code stored thereon that when executed by a processor, causes the processor to implement method(s) and features described above in this patent document. In some embodiments, an apparatus for vehicle operation comprises a processor configured to implement a method, the processor configured to implement method(s) and features described above in this patent document.

In this document the term "exemplary" is used to mean "an example of" and, unless otherwise stated, does not imply an ideal or a preferred embodiment.

Some of the embodiments described herein are described in the general context of methods or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Therefore, the computer-readable media can include a non-transitory storage media. Generally, program modules may include routines, programs, objects, components, data structures, etc. that perform particular tasks or implement particular abstract data types. Computer- or processor-executable instructions, associated data structures, and program modules represent examples of program code for executing steps of the methods disclosed herein. The particular sequence of such executable instructions or associated data structures represents examples of corresponding acts for implementing the functions described in such steps or processes.

Some of the disclosed embodiments can be implemented as devices or modules using hardware circuits, software, or combinations thereof. For example, a hardware circuit implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application. Similarly, the various components or sub-components within each module may be implemented in software, hardware or firmware. The connectivity between the modules and/or components within the modules may be provided using any one of the connectivity methods and media that is known in the art, including, but not limited to, communications over the Internet, wired, or wireless networks using the appropriate protocols.

While this document contains many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few implementations and examples are described and other implementations, enhancements and variations can be made based on what is described and illustrated in this disclosure.

What is claimed is:

1. A method of driving operation, comprising:
obtaining, by a computer located in a vehicle, at least two sets of pose information related to an object located on a road on which the vehicle is operating,
wherein each set of pose information includes one or more characteristics about the object, and
wherein each set of pose information is determined from an image obtained by a camera from at least two cameras located on the vehicle;
determining at least two weighted output vectors that include:
a first weighted output vector that is based on a first set of pose information and a first confidence value associated with the first set of pose information, and
a second weighted output vector that is based on a second set of pose information and a second confidence value associated with the second set of pose information;
determining, for the object, a set of pose information that are based on a combined weighted output vector that is obtained by combining the at least two weighted output vectors; and
causing the vehicle to perform a driving-related operation using the set of pose information for the object,
wherein for each set of pose information, the method further comprises:
computing a first output vector that includes values that are based on a first set of values from the first set of pose information, a first set of pre-determined weights, and a first set of pre-determined bias values;
computing a second output vector that includes values that are based on a second set of values from the second set of pose information, the first set of pre-determined weights, and the first set of pre-determined bias values; and
determining the first confidence value for the first output vector and the second confidence value for the second output vector, wherein the first confidence value and the second confidence value respectively describes a level of confidence that the first set of pose information and the second set of pose information describe characteristics of the object.

2. The method of claim 1, wherein the causing the vehicle to perform the driving-related operation includes:
performing a first determination, based on a first location of the object included in the set of pose information, that the object is located within a pre-determined distance of a second location of the vehicle; and
sending, in response to the first determination, an instruction that causes the vehicle to apply brakes.

3. The method of claim 1, wherein the determining the at least two weighted output vectors comprises:
obtaining the first weighted output vector by combining the values of the first output vector with the first confidence value in response to the first confidence value being greater than a threshold value; and
obtaining the second weighted output vector by combining the values of the second output vector with the second confidence value in response to the second confidence value being greater than the threshold value.

4. The method of claim 3,
wherein each value of the first output vector is multiplied by the first confidence value, and
wherein each value of the second output vector is multiplied by the second confidence value.

5. The method of claim 3, further comprising:
determining that a third weighted output vector for a third set of pose information is not to be calculated in response to determining that a third confidence value associated with the third set of pose information is less than the threshold value.

6. The method of claim 1,
wherein each of the first output vector and the second output vector is computed by performing a plurality of sets of computations,
wherein each set of computations from the plurality of sets of computations includes a plurality of output values,
wherein each output value is calculated by first multiplying each value from a set of values with a corresponding weight value from the first set of pre-determined weights to obtain a set of multiplied values, and then adding values from the set of multiplied values with each other and with a bias value, and
wherein the bias value is associated with a set of computations and is from the first set of pre-determined bias values.

7. The method of claim 6, wherein a first set of computations that is first in a sequence of computations performed for the plurality of sets of computations includes:
obtaining a first set of multiplied values by multiplying each value from the first set of values from the first set of pose information with a corresponding weight from the first set of pre-determined weights;
obtaining an added value by adding values from the first set of multiplied values; and
obtaining an output value by adding the added value with a first bias value, wherein the first bias value is associated with the first set of computations and is from the first set of pre-determined bias values.

8. An apparatus for vehicle operation, comprising:
a processor configured to implement a method, the processor configured to:
obtain, by a computer located in a vehicle, at least two sets of pose information related to an object located on a road on which the vehicle is operating,
wherein each set of pose information includes one or more characteristics about the object, and
wherein each set of pose information is determined from an image obtained by a camera from at least two cameras located on the vehicle;
determine at least two weighted output vectors that include:
a first weighted output vector that is based on a first set of pose information and a first confidence value associated with the first set of pose information, and
a second weighted output vector that is based on a second set of pose information and a second confidence value associated with the second set of pose information;
determine, for the object, a set of pose information that are based on a combined weighted output vector that is obtained by combining the at least two weighted output vectors; and
cause the vehicle to perform a driving-related operation using the set of pose information for the object,
wherein the set of pose information is determined based on a set of values from the combined weighted output vector, a second set of pre-determined weights, and a second set of pre-determined bias values.

9. The apparatus of claim 8, wherein each of the at least two sets of pose information for the object and the set of pose information for the object include a type of the object.

10. The apparatus of claim 8, wherein the at least two sets of pose information for the object is determined from images having a same timestamp.

11. The apparatus of claim 8, wherein each set of pose information includes a prior set of pose information about the object.

12. The apparatus of claim 8, wherein each set of pose information includes an identifier of the camera that provided the image.

13. A non-transitory computer readable program storage medium having code stored thereon, the code, when executed by a processor, causing the processor to implement a method, comprising:
obtaining, by a computer located in a vehicle, at least two sets of pose information related to an object located on a road on which the vehicle is operating,
wherein each set of pose information includes one or more characteristics about the object, and
wherein each set of pose information is determined from an image obtained by a camera from at least two cameras located on the vehicle;
determining at least two weighted output vectors that include:
a first weighted output vector that is based on a first set of pose information and a first confidence value associated with the first set of pose information, and
a second weighted output vector that is based on a second set of pose information and a second confidence value associated with the second set of pose information;
determining, for the object, a set of pose information that are based on a combined weighted output vector that is obtained by combining the at least two weighted output vectors; and
causing the vehicle to perform a driving-related operation using the set of pose information for the object,
wherein the set of pose information is determined based on a set of values from the combined weighted output vector, a second set of pre-determined weights, and a second set of pre-determined bias values.

14. The non-transitory computer readable program storage medium of claim 13, wherein each of the at least two sets of pose information for the object and the set of pose information for the object include a location of the object and a size of the object.

15. The non-transitory computer readable program storage medium of claim 13, wherein each of the at least two sets of pose information for the object and the set of pose information for the object include an orientation of the object on the road.

16. The non-transitory computer readable program storage medium of claim 13, wherein each of the at least two sets of pose information for the object and the set of pose information for the object include pixel positions of wheels of the object.

17. The non-transitory computer readable program storage medium of claim 13, wherein the causing the vehicle to perform the driving-related operation includes:
   performing a second determination, based on an orientation of the object and a type of the object included in the set of pose information, that the object is another vehicle having a first trajectory that intersects with a second trajectory of the vehicle; and
   sending, in response to the second determination, an instruction that causes a motor in the vehicle to steer the vehicle away from the another vehicle.

18. The non-transitory computer readable program storage medium of claim 13,
   wherein each of the at least two sets of pose information for the object and the set of pose information for the object include a ratio of a first area of a bounding box around the object that overlaps with another bounding box around another object to a second area of the bounding box around the object.

* * * * *